United States Patent [19]

Waelput

[11] Patent Number: 5,168,844
[45] Date of Patent: Dec. 8, 1992

[54] ADAPTER SYSTEM FOR USE WITH AN INTERNAL COMBUSTION ENGINE FLUSHING APPARATUS

[75] Inventor: Erik F. M. Waelput, Los Angeles, Calif.

[73] Assignee: Sludge Free, Inc., Van Nuys, Calif.

[21] Appl. No.: 702,407

[22] Filed: May 20, 1991

[51] Int. Cl.⁵ .................... F01M 11/03; F01M 11/04
[52] U.S. Cl. .................. 123/196 A; 184/1.5; 184/105.3; 123/196 R
[58] Field of Search ........... 123/196 R, 196 A, 196 S; 184/1.5, 105.3; 285/194, 205, 206, 208

[56] References Cited

U.S. PATENT DOCUMENTS

| | | | |
|---|---|---|---|
| 3,489,245 | 1/1970 | Broadwell | 184/1.5 |
| 3,867,999 | 2/1975 | Cox | 184/1.5 |
| 4,402,287 | 9/1983 | Cochran | 123/196 A |
| 4,406,784 | 9/1983 | Cochran | 123/196 A |
| 4,462,620 | 7/1984 | Bambenek et al. | 285/194 |
| 4,492,632 | 1/1985 | Mattson | 123/196 A |
| 4,508,195 | 4/1985 | Millet | 184/1.5 |
| 4,627,648 | 12/1986 | Moutpetit | 285/205 |
| 4,714,138 | 12/1987 | Zaccone | 184/1.5 |
| 4,756,349 | 7/1988 | Atkins | 184/1.5 |
| 4,909,205 | 3/1990 | Bewley, III | 123/196 S |
| 4,964,373 | 10/1990 | Bedi | 184/1.5 |
| 5,048,578 | 9/1991 | Dorf | 184/1.5 |
| 5,070,831 | 12/1991 | Yunick | 123/196 A |

Primary Examiner—E. Rollins Cross
Assistant Examiner—Erick Solis
Attorney, Agent, or Firm—Albert M. Herzig

[57] ABSTRACT

An adapter system for use with an internal combustion engine flushing apparatus which permits universal connection to the crank case and the lubrication system of a large number of different sizes and types of internal combustion engines. The adapter system comprises a first adapter referred to as a crank case adapter enabling a hose of a flushing apparatus to be connected within the drain plug port of an oil path of the engine. This first adapter is provided with a mechanism to enable the adapter to fit within the drain plug port of substantially all automotive vehicle internal combustion engines without being threadably secured within the drain plug hole. A second adapter set or so called lubrication system adapter set is comprised of a plurality of different lubrication system adapter pieces which individually or in combination fit at the oil filter port leading to the lubrication system of the internal combustion engine. The various second adapter pieces individually or in combination fit within the oil filter port leading to the lubrication system in substantially internal combustion engines. In this way, a second conduit from the flushing apparatus can be connected to the vehicle engine so that a flushing solution in the apparatus can be circulated through and clean the internal combustion engine.

12 Claims, 5 Drawing Sheets

ADAPTER SYSTEM FOR USE WITH AN INTERNAL COMBUSTION ENGINE FLUSHING APPARATUS

BACKGROUND OF THE INVENTION

1. Field of the Invention

This invention relates in general to certain new and useful improvements in an internal combustion engine flushing apparatus and more particularly, to a unique adapter system for use with such apparatus enabling connection to the crank case and/or lubrication system of a large number of different sizes and types of engines.

2. Brief Description of the Prior Art

In relatively recent years, there have been several proposed apparatus for flushing internal combustion engines. It is well known that lubricants and particularly the circulating oils of these internal combustion engines must be periodically replaced. Moreover, it is well established that the crank case and the lubricating system of these internal combustion engines tend to accumulate dirt and the decomposed matter from the circulating oils.

Many foreign particles are suspended within the oil and removed by the filter of the internal combustion engine or otherwise removed when the oil is periodically drained for replacement by new oil. However, it is well recognized that many of these foreign particles are not removed by the filter system or by the periodic changing of the lubricating oil. As a result, these foreign particles accumulate within the internal combustion engine and can ultimately lead to premature wear if not damage to the engine.

As a result of some of the drawbacks of the filter system and periodic oil changes, it has been recognized that a flushing apparatus can be used for removing some of the foreign particles which accumulate, particularly within the crank case, of an internal combustion engine. In these flushing apparatus, a conduit is connected to the drain plug port at the oil pan of the engine. Another conduit is connected to the oil filter port leading to the lubrication system of the engine. These two conduits are maintained in a series circulation pattern so that a cleansing fluid or flushing fluid can be pumped through the vehicle engine in one conduit, and out of the vehicle engine with foreign particles in the other conduit.

While there have been several relatively recently proposed flushing apparatus, essentially all of the proposed and the existing commercially available flushing apparatus suffer from at least one serious disadvantage. In essentially all cases, there is no universal connection system to fit a large number of vehicles. It is well recognized that the drain plug port of one vehicle manufacturer may be of a size different than the drain plug port of another vehicle manufacturer. According, a large number of conduit each containing different fittings on the ends thereof was necessary in order to use these internal combustion engine flushing apparatus.

It is also recognized that the oil filter ports leading to the lubrication system of the engine will differ in both size and construction from vehicle to vehicle. In some cases, projections extend from the lubrication system out of the oil filter port in order to enable mounting of the filter. Thus, it is necessary to accommodate each of the different types and sizes of oil filter ports in the various internal combustion engines.

The commercially available and proposed automotive vehicle internal combustion engine flushing apparatus are not capable of adapting to the filter ports of a large number of many automotive vehicles. Accordingly, the commercially available flushing apparatus and even the proposed apparatus are not capable of being used with the internal combustion engines of several manufacturers of automobiles.

In many cases, parties attempting to use the flushing apparatus with vehicles not adapted to be connected to a particular flushing apparatus have attempted to use make shift arrangements. Often times, the conduit will not hold at the oil filter port or at the drain plug port thereby breaking away and permitting the flushing fluid to escape from the system. When the flushing fluid is of a flammable type or if it contains relatively harmful substances which should not be inhaled, this creates a danger to the working personnel not to mention the property itself. In addition, one can easily damage the internal combustion engine by attempting to use a make shift arrangement for connecting conduit to an engine port which is not sized or adapted to receive a fitting on that conduit.

OBJECTS OF THE INVENTION

It is, therefore, one of the primary objects of the present invention to provide an adapter system for use with an internal combustion engine flushing apparatus and which enables connection of a flushing apparatus to a large number of different sizes and shapes of ports of internal combustion engines.

It is another object of the present invention to provide an adapter system of the type stated which employs a first adapter sized to fit within the drain plug port of an oil pan of an engine and with means associated therewith to enable this adapter to fit within drain plug ports of a large number of internal combustion engines along with a second adapter set.

It is a further object of the present invention to provide an adapter system of the type stated which uses a second adapter set comprised of a plurality of second adapter pieces and which are usable at the oil filter port leading to the lubrication system of an internal combustion engine so as to fit a large number of internal combustion engines.

It is an additional object of the present invention to provide an adapter system of the type stated which increases the versatility and use of most commercially available internal combustion engine flushing apparatus.

It is another salient object to provide an adapter system of the type stated which can be produced at a relatively low cost and which is highly efficient in operation.

It is still a further object of the present invention to provide a method of adapting the flushing fluid conduit from an internal engine flushing apparatus to the drain plug port and the oil filter port of a large number of internal combustion engines.

With the above and other objects in view, my invention resides in the novel features of form, construction, arrangement and combination of parts presently described and pointed out in the claims.

BRIEF SUMMARY OF THE INVENTION

The present invention relates to an adapter system for use with an internal combustion engine flushing apparatus which permits universal connection to the crank case and lubrication system of a large number of different sizes and types of engine ports. The flushing apparatus is of a conventional construction but generally includes a first liquid conduit for delivery of a flushing liquid from the flushing apparatus to the engine. The flushing apparatus also includes a second conduit for return of the flushing liquid from the engine back to the flushing apparatus. The adapter system is highly effective for although not limited to use in automotive vehicle internal combustion engines.

The adapter system generally comprises an oil pan adapter sized to fit within the drain plug port of the oil pan of the internal combustion engine. A means such as a handle is associated with the adapter to enable the adapter to fit within the drain plug port of a very large number, if not substantially all internal combustion engines, without being threadably secured within the drain plug port.

A lubrication system adapter set is also provided with the adapter system and is comprised of a plurality of adapter pieces. These adapter pieces are selectively usable at the oil filter port leading to the lubrication system of the internal combustion engine. This lubrication adapter set and particularly the pieces thereof individually or in combination are sized to fit around the oil filter port of substantially all internal combustion engines and create a liquid tight seal with the exterior face of the internal combustion engine.

The oil pan adapter comprises some means for causing the adapter to engage a portion of the engine block surrounding the drain plug port with a snug liquid-tight seal. More specifically, the oil drain plug part adapter comprises a fitting for connection to the conduit from the flushing apparatus. A pair of fingers extend from the fitting and have hook ends sized to be inserted into the drain plug port when the fingers are oriented in a first direction. Means is provided with the adapter for changing the orientation of at least on of the fingers to cause an orientation in a second direction and which thereby enables the adapter to be hooked within the drain plug port.

The oil pan adapter also comprises a sleeve means which is associated with the fitting. This sleeve means is located on an externally threaded element extending from the fitting and is threadedly shiftable therealong. The sleeve means is designed to engage the exterior surface of the internal combustion engine with a liquid tight seal and thereby sealingly hold the fitting at the drain plug port.

The lubrication system adapter set comprises a plurality of individual adapters as aforesaid. One of the main adapters is a cap for disposition over the oil filter port. Means is associated with this cap for connection to a fitting on an end of a conduit from the flushing apparatus. Threaded means is also provided on the cap for engaging a threaded section surrounding the oil filter port and thereby retaining the cap over the port of the engine with a liquid tight seal. The cap is also provided with a threaded section for connection to an externally threaded post which may project from some engines at the oil filter port.

The lubrication system adapter set also comprises a sleeve sized for connection to the cap which has a first threaded section for connection to the threaded means on the cap. The sleeve also has a second threaded section spaced from the first threaded section for engaging a threaded section surrounding the oil filter port.

The adapter set further comprises a diametrically enlarged plate which is sized to extend over the oil filter port. This plate has a threaded section for connection to the sleeve or to the cap. Moreover, a sealing element on the plate enables engagement with the engine block with a liquid tight seal.

The adapter set additionally comprises a diametrically reduced sleeve for connection to the threaded section of the cap. This diametrically reduced sleeve is further provided with another threaded section for connection to the internal combustion engine. A separate threaded ring may also be used with the diametrically reduced sleeve if required. Finally, the adapter set comprises a plug for connection to the threaded section of the cap.

This invention possesses many other objects and advantages and has other purposes to be made more clearly apparent from a consideration of the forms in which it may be embodied. One of these forms is shown in the accompanying drawings and described in the detailed description of this invention. It should be understood that this detailed description is set forth only for purposes of understanding the general principles of this invention and that such description is not to be taken in a limiting sense.

BRIEF DESCRIPTION OF THE DRAWINGS

Having thus described the invention in general terms, reference will now be made to the accompanying drawings (five sheets) in which:

DETAILED DESCRIPTION OF PREFERRED EMBODIMENTS

Figure 1:
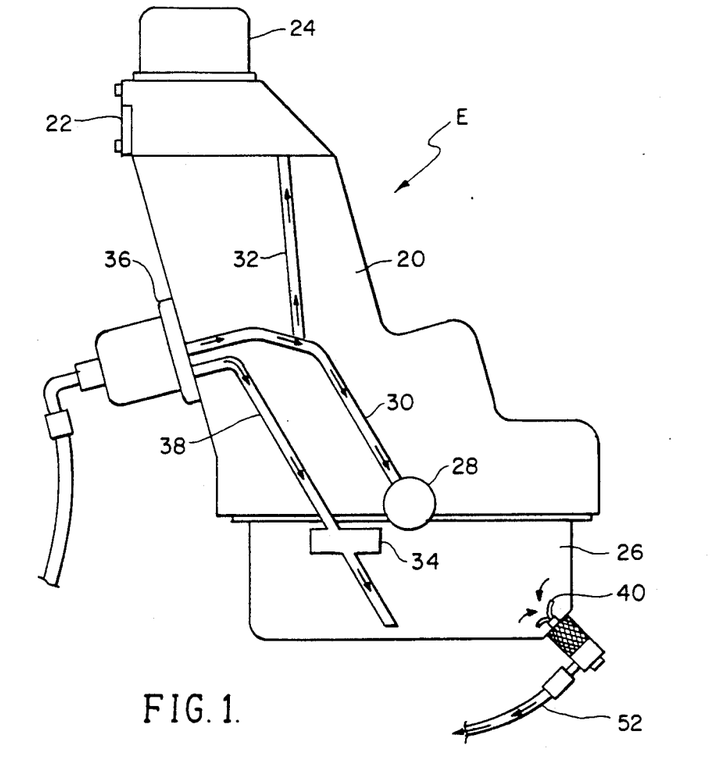
FIG. 1 is a somewhat schematic side elevation view of a portion of an internal combustion engine showing elements of the adapter system of the present invention connected thereto.

Referring now in more detail and by reference characters to the drawings which illustrate preferred embodiments of the present invention, "E" designates a portion of an internal combustion engine which is only schematically illustrated, in FIG. 1 of the drawings. In this case, it can be observed that the engine E is comprised of an engine block 20 having a cylinder head 22 and a valve cover 24. Further, an oil pan 26 is secured to the lower end of the engine block.

The operating components of the internal combustion engine are neither illustrated nor described in detail herein since they are well known and of a conventional arrangement. However, for purposes of more fully understanding the invention, a crank shaft 28 is schematically illustrated within the engine block 20 and receives oil from an oil passage 30. In like manner, the valves and other components within the engine block and particularly the piston-cylinder arrangement receive lubricating oil through a second oil passageway 32.

Located within the oil pan 26 is an oil pump 34 and which is in fluid communication with an oil filter port 36 through a duct 38. In normal operation, a conventional oil filter is located at this oil filter port and receives the lubricating oil of the engine for cleaning same.

The oil pan 26 is also shown as being provided with a drain plug port 40. In this case, a conventional drain plug (not shown) would normally be threadedly secured within the drain plug port 40 and removed therefrom when it is desired to drain the oil from the crank case and particularly the oil pan of the internal combustion engine.

The adapter system of the present invention comprises a first adapter 50 which is more fully illustrated in FIGS. 2-5 of the drawings. This adapter 50 is adapted for connection to an end of a flushing liquid conduit 52 forming part of an internal combustion engine flushing apparatus. Inasmuch as the flushing apparatus is conventional, it is neither illustrated or described in any detail herein. However, reference can be made to U.S. Pat. No. 3,489,245 dated Jan. 13, 1970 to E. R. Broadwell for "Apparatus For Flushing Internal Combustion Engines".

These flushing apparatus usually include a pumping mechanism as well as one conduit for introducing a flushing liquid into the internal combustion engine and a second conduit for removing the flushing liquid from the internal combustion engine. The one conduit leads to the lubrication system of the engine through the oil filter port in the engine block and the other conduit leads to the crank case, and particularly, the oil pan through the oil pump drain plug port. More preferably, in these commercial internal combustion engine flushing apparatus, the flushing fluid is introduced at the oil filter part leading to the lubrication system in the engine block and the flushing fluid is removed from the conduit connected to the drain plug port in the oil pan of the engine.

Figure 2:
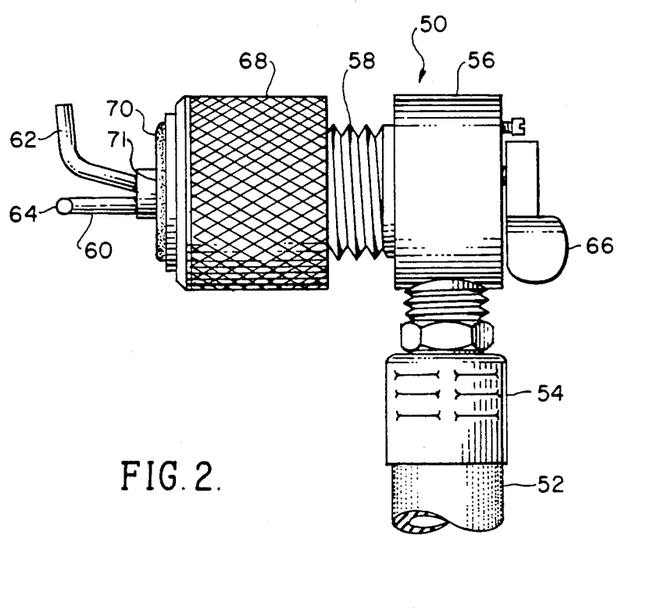
FIG. 2 is a side elevational view showing an adapter for connection to a drain plug port in an oil pan of an internal combustion engine.
Figure 3:
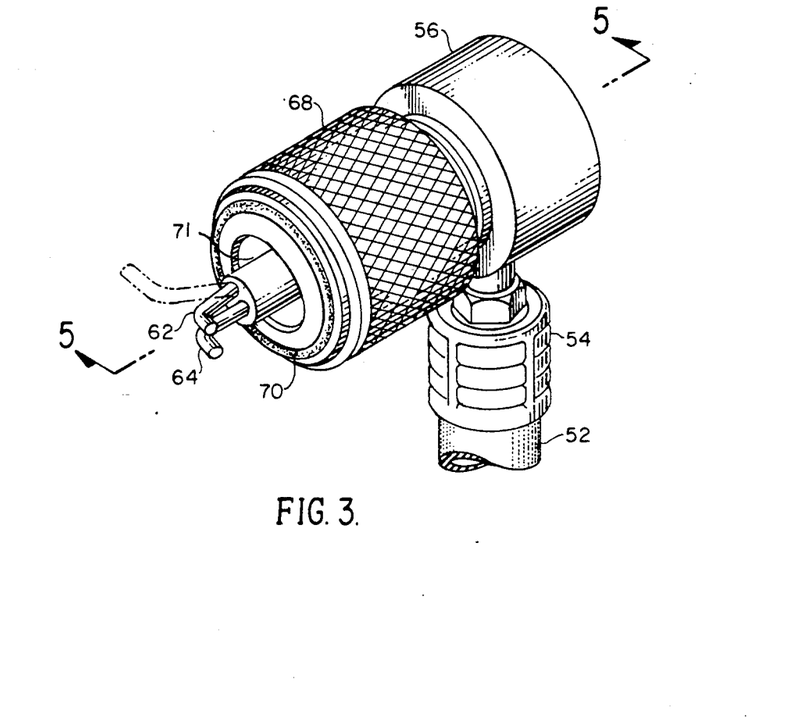
FIG. 3 is a perspective view showing a portion of that adapter of FIG. 2.

The adapter 50 is connected to the conventional conduit 52 from the flushing apparatus through a conventional coupling 54 in the manner as best illustrated in FIG. 2. The adapter 50 is comprised of a disk 56 having an externally threaded pipe section 58 extending forwardly therefrom. Extending through the pipe section 58 are a pair of rods 60 which terminate in outwardly extending fingers 62 and 64, as best illustrated in FIGS. 2, 3 and 5 of the drawings. These rods 60 are connected to a manually rotatable lever or handle 66 (as best shown in FIG. 4) for rotating one or both of the fingers 62 or 64.

Figure 4:
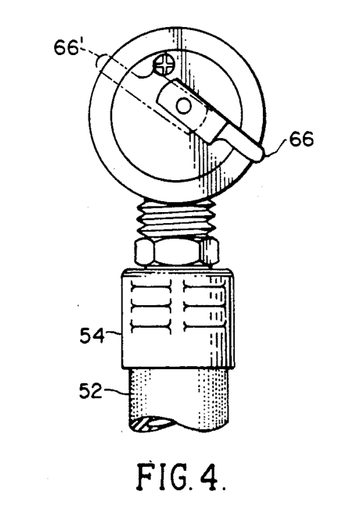
FIG. 4 is an end elevational view showing one portion of the adapter of FIG. 3 and particularly a turning knob for rotating a finger forming part of the adapter.
Figure 5:
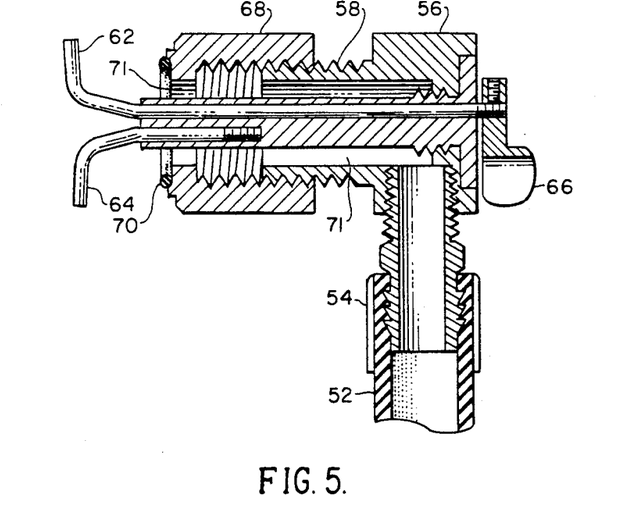
FIG. 5 is a vertical sectional view taken along lines 5—5 of FIG. 3.

When the handle 66 is in the position as illustrated in FIG. 4, the pair of fingers 62 and 64 will be oriented in the position as shown in FIG. 5, which constitutes a locking position. However, when the handle 66 is rotated approximately 90 degrees to the position as shown in the dotted lines represented by 66' of FIG. 4, one of the fingers 62 will be rotated to a position generally registered with the finger 64, that is pointing in the same direction, as best illustrated in FIGS. 2 or 3 of the drawings.

When the fingers 62 and 64 are effectively registered with respect to one another, that is they are oriented in essentially the same direction they can be easily inserted into the drain plug port of the vehicle engine. After being inserted through the drain plug port, the handle 66 is rotated to the position as shown in the solid lines of FIG. 4 so that the fingers 62 and 64 achieve the orientation as shown in FIG. 5. In this position, the fitting is locked within the drain plug port. However, the fitting is not necessarily in fluid tight communication at this point.

In order to achieve a fluid tight communication, a locking sleeve 68 located on the pipe section 58 is rotated toward the engine block. A sealing ring 70 on the exterior face of this sleeve 68 will thereupon abut against the exterior face of the engine block. The fingers 62 and 64 will hook inside of the oil pan and firmly engage the inner surface of the oil pan while the sleeve 68 is tightened against the exterior face thereof. The sealing ring 70 will thereupon provide a complete fluid tight seal. A flushing fluid opening 71 extends through the pipe 58 and the disk 56 and leads to the coupling 54 and the conduit 52. In this way, the flushing fluid can be removed from the crank case of the vehicle with a fluid tight connection thereto.

It can be understood that the fingers are sized so that they will essentially fit within the drain plug port of essentially all of the known and commercially available internal combustion engines. This is particularly true of automobile vehicle internal combustion engines since most internal combustion engine flushing apparatus are designed for use with automotive vehicle internal combustion engines.

The present invention also provides a second adapter set, usually referred to as a lubrication system adapter set, and which is more fully illustrated in FIGS. 6-14 of the drawings. This lubrication system adapter set is comprised of a series of second adapter pieces which ar hereinafter described in more detail. These lubrication system adapter pieces, individually or in combination with one another can be used for connection to the oil filter port leading to the lubrication system of an internal combustion engine.

Figure 6:
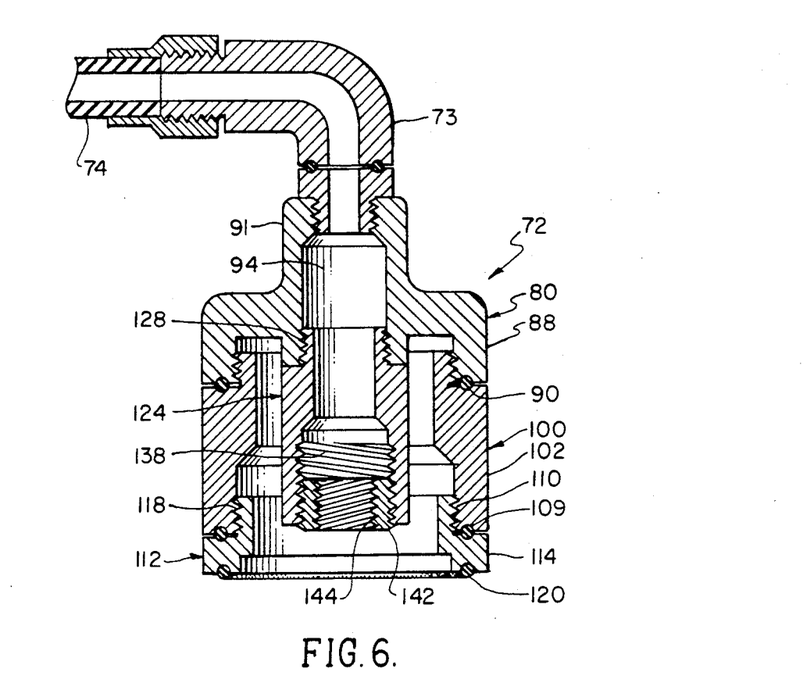
FIG. 6 is a vertical sectional view showing several connected lubrication system adapter pieces forming part of an adapter set used for connection to the oil filter port leading to the lubrication system of an internal combustion engine.

Referring now to FIG. 6, there is illustrated one proposed lubrication system adapter arrangement 72 which is provided for connection to the oil filter port 36 of the internal combustion engine E. In this case, the components of the second adapter set 72 are connected through a swivel coupling 73 to a flushing fluid conduit or hose 74 in the manner as best illustrated in FIG. 6. Generally, although not necessarily, this conduit 74 is designed to deliver the flushing fluid to the lubricating system of the internal combustion engine and the conduit 52 is designed to return the flushing fluid back to the flushing apparatus.

Figure 7:
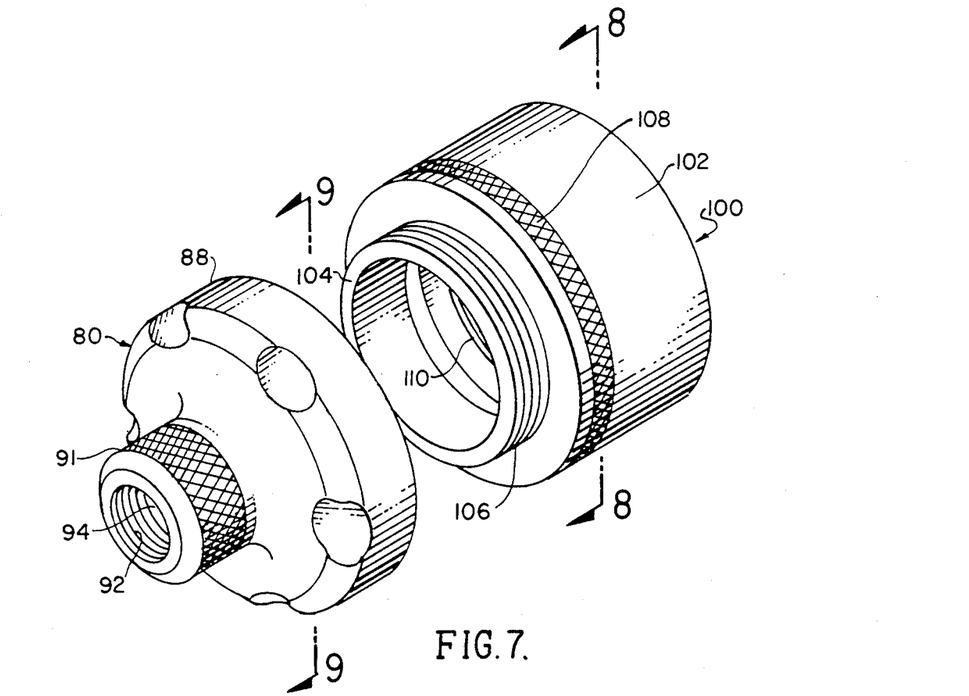
FIG. 7 is an exploded perspective view showing a pair of second adapter pieces forming part of a lubrication system adapter set.
Figure 8:
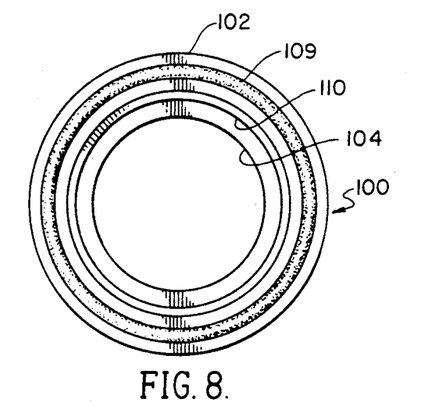
FIG. 8 is an end elevational view taken substantially along the plane of line 8—8 of FIG. 7.
Figure 9:
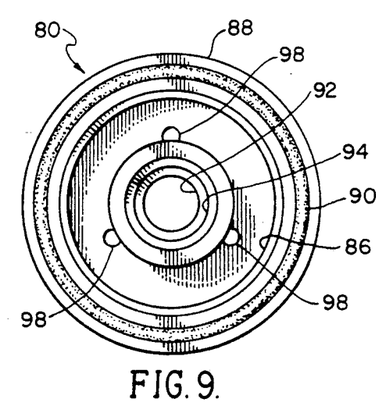
FIG. 9 is an end elevational view taken substantially along the plane of line 9—9 of FIG. 7.
Figure 14:
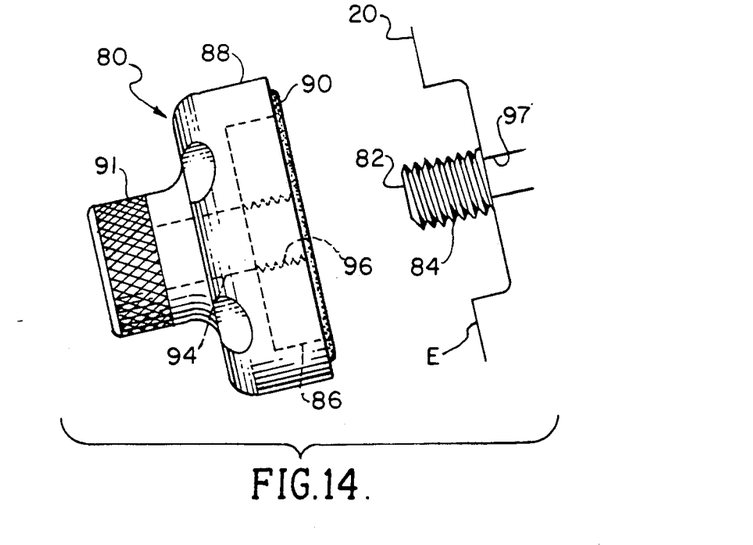
FIG. 14 is a fragmentary side elevational view showing connection of one adapter piece of FIG. 13 to an oil filter port of an internal combustion engine.

Referring now to FIGS. 7-9 of the drawings, two lubrication system adapter components forming part of the lubrication system adapter set are more fully illustrated. In this case, there is provided an adapter 80 which is sized to extend over and be secured to the engine block at the oil filter port of the lubricating system forming part of the internal combustion engine. In this case, FIG. 14 illustrates a pipe 82 extending outwardly through the port 36 on the internal combustion engine block 20 and which is externally threaded at 84 in order to receive a conventional oil filter. The pipe 82 leads to the lubrication system of the engine in a conventional manner. It should be understood that other means for mounting the oil filter to the engine block 20 may be provided and that the adapter system of the invention will accommodate these other mounting systems.

When the conventional oil filter is attached to the engine block 20, it is usually provided with a projected skirt having an internally threaded section (not shown) for connection to the externally threaded section 84 of the pipe 82. In this case, the adapter 80 is provided with an internally threaded section 86 as hereinafter described, for threaded connection to the threads 84 on the pipe 82 projecting from the engine block.

Figure 10:
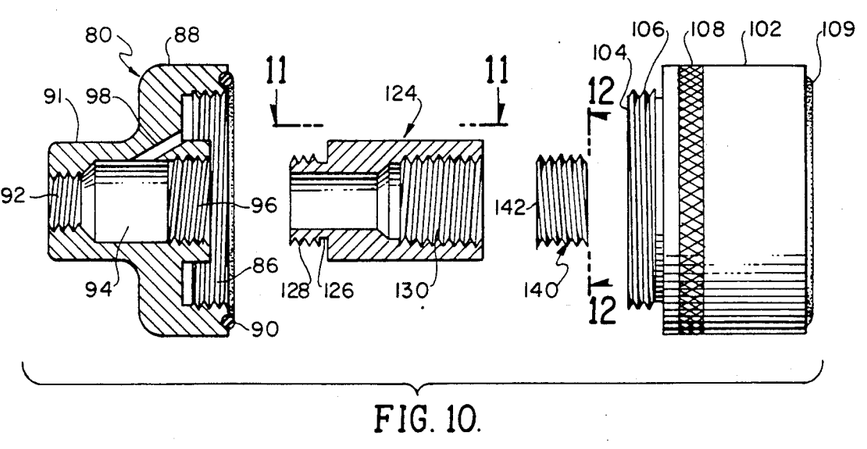
FIG. 10 is an exploded view, partially in section, and showing several lubrication system adapter pieces arranged to be connected together for securement to an oil filter port leading to the lubrication system of an internal combustion engine.

Referring now in more detail by reference to FIGS. 7 and 10, it can be observed that the fitting 80 is provided with an outer cap 88 having the internally threaded section 86 for connection to another lubrication system adapter piece as shown in FIG. 10. Moreover, the cap 88 is provided on its periphery with an annularly extending rubber seal 90 sized to engage the exterior surface of the engine block 20 when the fitting 80 is threadedly secured on the pipe 82 as hereafter described. In this way, a fluid type seal is created with the engine block between a conduit, such as the conduit 74, and the port 36 leading to the lubrication system of the internal combustion engine.

The cap 80 is provided with an outwardly projecting hub 91 and which is provided with an internally threaded aperture 92 for receiving a threaded nut of a swivel coupling, such as the swivel coupling 73 illustrated in FIG. 6. The internally threaded aperture 92 leads to a passageway 94 in the hub 90 and the cap 80 and which in turn, leads to another internally threaded section 96 in the cap 80. The threaded section 96 is provided for threaded securement to the threaded section 84 on the pipe 82 so that the conduit 74 communicates with a duct 97 in the engine block E.

In some cases, the central internal threaded section 96 is blocked by another lubrication system adapter component, as hereinafter described, and therefore fluid communication between a conduit connected at the internally threaded opening 92 and the duct 97 of the engine occurs through small openings 98 in the cap 80 (as best shown in FIG. 10) and which will also lead to the duct 97 of the internal combustion engine. Thus, and in some embodiments, it is only necessary to use the lubrication system fitting 80 of the present invention with the internal combustion engine flushing apparatus.

In some cases, the lubrication system adapter 80 is not adapted to secure to the engine block 20. In this case, another lubrication system adapter 100 is provided, as shown in FIG. 7. In this case, the adapter 100 is designed for mating engagement with and may be used in combination with the adapter 80.

The adapter 100 also comprises an outer ring 102 with a diametrically reduced outwardly extending hub 104 containing an externally threaded section 106. In this case, the externally threaded section 106 is sized for threaded engagement with the internally threaded section 86 of the adapter 80. This arrangement can best be seen in FIGS. 7 and 10 of the drawings. The adapter ring 102 is also provided with a knurled section 108 for engagement by the fingers of a user so as to turn the adapter 100 and cause a threaded engagement between the adapter 100 and the adapter 80. An annular rear seal 109 is also located at the rearward end of the adapter 100 as best shown in FIG. 10.

The ring 102 is also provided with an internally threaded section 110 which is also sized to fit on an outwardly projected flange of an engine block or to receive another fitting as hereafter described. In this case, the internally threaded section 110 may have the same size and diameter as the threaded section 86 on the adapter 80. The two adapters 80 and 100 would be used in combination if a projected mounting rod extended beyond the filter opening 36. Otherwise, the threaded section 110 could have a different inner diameter or different sized threads, as may be required.

Figure 13:
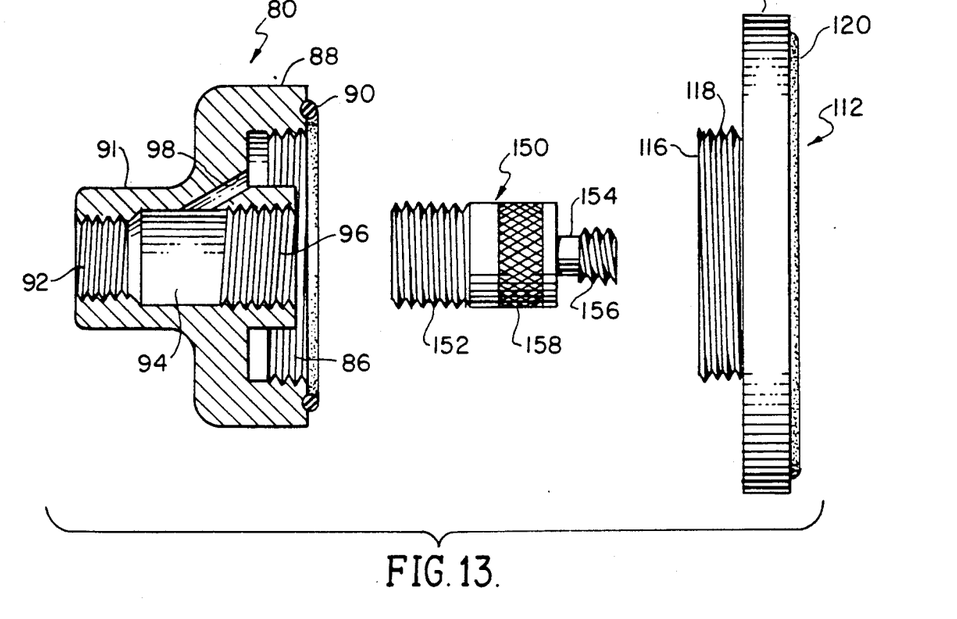
FIG. 13 is an exploded side elevational view, partially in section, and showing still a further combination of lubrication system adapter pieces which can be selectively used at the oil filter port of an internal combustion engine.

Also provided for use with the adapter 80 and/or the adapter 100 is another adapter plate 112, as best illustrated in FIG. 13 of the drawings. In this case the adapter plate 112 is provided with a relatively thin disk like section 114 having an outwardly projecting hub 116. The hub 116 is provided with an externally threaded section 118 sized to be received at the internally threaded section 86 of the adapter 80. In like manner, the externally threaded section 118 is also sized for threaded engagement with the internally threaded section 110 of the adapter 100.

In many cases, all three adapters 80, 100 and 112 are used together in combination. In this case, and in one particular automotive vehicle internal combustion engine a substantial depth of an adapter is required. Thus, the adapter 100 is connected to the adapter 80. Moreover, inasmuch as the filter port may be quite large, the adapter plate 112 may be required. In this case, the adapter plate 112 is provided with an annular sealing ring 120 which faces and is adapted to sealingly engage against an engine block 20.

Figure 11:
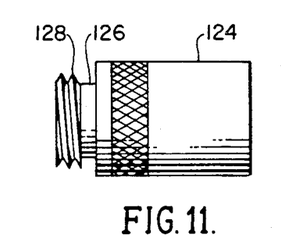
FIG. 11 is a side elevational view of one of the adapter pieces of FIG. 10 in the nature of a plug, and taken substantially along the plane of line 11—11 of FIG. 10.

In many cases, a mounting post (not shown) extends outwardly from the engine block 20 and the oil filter is threadedly secured onto the outwardly extending mounting post. For this purpose, an adapter sleeve 124 is employed, as illustrated in FIGS. 10 and 11. This adapter sleeve 124 has a diametrically reduced projected end 126 which is, in turn, provided with an externally threaded section 128. In this case, the externally threaded section 128 is sized to engage the internally threaded section 96 of the adapter 80 to be retentively held thereby. Moreover, the adapter sleeve 124 is provided with an internally threaded section 130 at its opposite end for securement to the externally threaded post which may extend outwardly from the oil filter port of the engine block.

Figure 12:
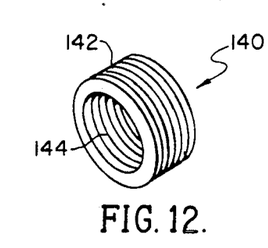
FIG. 12 is a perspective view of another one of the adapter pieces of FIG. 10, in the nature of a connecting ring, and taken substantially along the plane of line 12—12 of FIG. 10.

In some cases, the outwardly extending post, projecting outwardly from the oil filter port of the engine block, has a smaller diametrical size. For this purpose, an adapter ring 140 may be employed. The adapter ring 140 is provided with an externally threaded section 142 and an internally threaded section 144, as best illustrated in FIG. 12 of the drawings. The externally threaded section 142 is sized to threadedly engage the internally threaded section 130 of the adapter sleeve 124 or the internally threaded section 96 of the adapter 80. In like manner, the internally threaded section 144 of the adapter ring 140 is sized to threadedly engage the externally threaded section of a post (not shown) extending outwardly from the oil filter port of the engine block.

It should be understood that the adapter ring 140 could also be used directly with the adapter 80 by threaded engagement with the internally threaded section 96. However, in most cases, the adapter ring 140 is used in combination with the adapter sleeve 124. Moreover, and in some embodiments, the adapter 80, in combination with the adapter 100 and the adapter plate 112, are used in combination with the adapter sleeve 124 and in some cases, in combination with the adapter ring 140 as well.

In at least one or more internal combustion engines, the flushing liquid cannot travel through the bore 94 and through the internally threaded section 96 of the adapter 80. For this purpose, an adapter plug 150 may be employed as best illustrated in FIG. 13. This adapter plug 150 is provided with an externally threaded section 152 for threaded engagement with the internally threaded section 96 of the adapter 80. Also, the externally threaded section 152 is sized for an engagement with the internally threaded section 130 of the adapter sleeve 124, if required.

The adapter plug 150 is provided at its opposite end with a diametrically reduced post 154 containing an externally threaded section 156. In this case, the externally threaded section 156 is sized to fit within a threaded recess of a post extending outwardly from the oil filter opening of an engine block. Finally, the adapter plug 150 may be provided with a knurled section 158, as best illustrated in FIG. 13, for engagement by the fingers of a user.

As indicated previously, the various lubrication system adapters are all designed for use at the oil filter port leading to the lubricating system of the engine. As also stated, these adapter pieces, as illustrated in FIGS. 6 through 14 of the drawings, are all used individually or in combination with one another for accommodating the various sized oil filter openings. Further, since some oil filters are mounted on posts of different sizes and even posts which have internally threaded sections, it may be necessary to use the various adapter pieces which are illustrated and described in one or more other combinations. Nevertheless, it has been found that the various second adapters which are illustrated in FIGS. 6 through 14 in combination enables fitting of a conduit from a flushing apparatus to virtually all of the commercially available automotive vehicle internal combustion engines.

This lubrication system adapter set along with the first adapter, more fully illustrated in FIGS. 2-5 of the drawings, enables essentially an internal combustion engine flushing apparatus to be used almost with every commercially available automotive vehicle internal combustion engine. Presumably, there were many vehicles which could not assume the advantage of an internal combustion engine cleansing apparatus. This problem has now been completely obviated by the provision of the adapter system of the present invention.

Thus, there has been illustrated and described a unique and novel adapter system which can be used with an internal combustion engine flushing apparatus to enable connection to a large variety of internal combustion engines and which therefore provides a universality of attachment. Thus, the present invention fulfills all of the objects and advantages which have been sought. It should be understood that any changes, modifications, variations and other uses and applications will become apparent to those skilled in the art after considering the specification and the accompanying drawings. Therefore, any and all such changes, modifications, variations and other uses and application which do not depart from the spirit and scope of the invention are deemed to be covered by the invention.

Having thus described the invention, what I desire to claim and secure by letters patent is:

1. An adapter system for use with an internal combustion engine flushing apparatus which permits universal connection to the crank case and oil filter port of large number of different sizes and types of internal combustion engines for introducing fluid through the oil filter port and draining of said fluid through the crankcase, said adapter system comprising:
   a) an oil pan adapter sized to fit within the drain plug port of an oil pan of the engine,
   b) means associated with said oil pan adapter to enable the adapter to fit within said drain plug port of substantially all internal combustion engines without being threadedly secured in the drain plug port, and
   c) a lubrication system adapter set comprised of a plurality of adapter pieces which are selectively usable at the oil filter port leading to the lubrication system of the engine, such lubrication system adapter pieces individually or in combination fitting around the oil filter port of substantially all internal combustion engines and creating a liquid tight seal therewith.

2. The adapter system of claim 1 further characterized in that the oil pan adapter comprises means for causing the oil pan adapter to engage a portion of the engine block surrounding the drain plug port with a snug liquid tight seal in substantially all commercially used automotive vehicle internal combustion engines.

3. The adapter system of claim 1 further characterized in that the lubrication system adapter set comprises at least an adapter threadedly engagable with threads surrounding an oil filter port of an engine block and at least one adapter threadedly engagable with a post projecting at the oil filter part.

4. The adapter system of claim 1 further characterized in that the lubrication system adapter set comprises a plurality of adapters threadedly engagable with threads surrounding an oil filter part in the same manner as an oil filter engages said threads, and at least one adapter threadedly engagable with a post projecting outwardly from the engine block at the oil filter port.

5. An adapter for use with an internal combustion engine flushing apparatus permitting connection of a fitting at a large number of different types and sizes of oil drain plug ports of internal combustion engines, said adapter comprising:

a) a fitting for connection to a conduit from an internal combustion engine flushing apparatus,
b) a pair of fingers extending from said fitting and having hook ends sized to be inserted into the oil drain plug port when both fingers are oriented in a first direction,
c) means for changing the orientation of at least one of said fingers to cause the latter finger to be oriented in a second direction and which thereby hooks said fitting at said drain plug port, and
d) sleeve means associated with said fitting and engaging the exterior surface of the internal combustion engine in a liquid tight seal and thereby sealingly holding said fitting at said drain plug port.

6. The adapter system of claim 5 further characterized in that a sealing element is located on a face of said sleeve means and sealingly engages an exterior wall of the internal combustion engine.

7. The adapter system of claim 5 further characterized in that a threaded element extends from said fitting and said sleeve means is threadedly shiftable along said threaded element to engage the exterior surface of the engine and thereby accommodate different engine wall thicknesses.

8. An adapter set for use with an internal combustion engine flushing apparatus permitting connection of a conduit from the apparatus at the oil filter port leading to the lubrication system of the internal combustion engine, said adapter set comprising:
a) a cap for disposition over the oil filter port;
b) means associated with said cap for connection to a fitting on an end of the conduit from the flushing apparatus;
c) threaded means on said cap for engaging a threaded section surrounding the oil filter port and retaining said cap over said port on the engine with a liquid tight seal;
d) said cap also having a threaded section for connection to an externally threaded post projecting from an engine at an oil filter port; and
e) said adapter set comprises a sleeve for connection to said cap and having a first threaded section for connection to the threaded means on said cap, said sleeve also having a second threaded section for engaging the threaded section surrounding the oil filter port.

9. The adapter system of claim 8 further characterized in that said adapter set comprises a diametrically enlarged plate to extend over said oil filter port, said plate having a threaded section for connection to the second threaded section of said sleeve or to the threaded means on said cap.

10. An adapter set for use with an internal combustion engine flushing apparatus permitting connection of a conduit from the apparatus at the oil filter port leading to the lubrication system of the internal combustion engine, said adapter set comprising:
a) a cap for disposition over the oil filter port;
b) means associated with said cap for connection to a fitting on an end of the conduit from the flushing apparatus;
c) threaded means on said cap for engaging a threaded section surrounding the oil filter port and retaining said cap over said port on the engine with a liquid tight seal;
d) said cap also having a threaded section for connection to an externally threaded post projecting from an engine at an oil filter port; and
e) said adapter set comprises a diametrically reduced sleeve for connection to the threaded section of said cap, said diametrically reduced sleeve also having a threaded section for connection to said internal combustion engine.

11. An adapter set for use with an internal combustion engine flushing apparatus permitting connection of a conduit from the apparatus at the oil filter port leading to the lubrication system of the internal combustion engine, said adapter set comprising:
a) a cap for disposition over the oil filter port;
b) means associated with said cap for connection to a fitting on an end of the conduit from the flushing apparatus;
c) threaded means on said cap for engaging a threaded section surrounding the oil filter port and retaining said cap over said port on the engine with a liquid tight seal;
d) said cap also having a threaded section for connection to an externally threaded post projecting from an engine at an oil filter port; and
e) said adapter set comprises a plug for connection to the threaded section of said cap.

12. An adapter set for use with an internal combustion engine flushing apparatus permitting connection of a conduit from the apparatus at the oil filter port leading to the lubrication system of the internal combustion engine, said adapter set comprising:
a) a cap for disposition over the oil filter port;
b) means associated with said cap for connection to a fitting on an end of the conduit from the flushing apparatus;
c) threaded means on said cap for engaging a threaded section surrounding the oil filter port and retaining said cap over said port on the engine with a liquid tight seal;
d) said cap also having a threaded section coaxial with said threaded means for connection to an externally threaded post projecting from an engine at an oil filter port;
e) said cap having a first open ended passageway of a given diameter terminating at its appropriate ends with threads to engagingly receive said fitting and said threaded section, respectively;
f) said cap having a threaded cavity surrounding said threaded section constituting said threaded means;
g) said cap having an open ended bore communicating said passageway with said cavity.

* * * * *